United States Patent
Muegge

(10) Patent No.: US 10,539,288 B2
(45) Date of Patent: Jan. 21, 2020

(54) LIGHTING DEVICE FOR VEHICLES

(71) Applicant: HELLA GmbH & Co. KGaA, Lippstadt (DE)

(72) Inventor: Martin Muegge, Geseke (DE)

(73) Assignee: Hella GmbH & Co. KGAA, Lippstadt (DE)

( * ) Notice: Subject to any disclaimer, the term of this patent is extended or adjusted under 35 U.S.C. 154(b) by 49 days.

(21) Appl. No.: 15/916,792

(22) Filed: Mar. 9, 2018

(65) Prior Publication Data
US 2018/0195680 A1 Jul. 12, 2018

Related U.S. Application Data

(63) Continuation of application No. PCT/EP2016/071325, filed on Sep. 9, 2016.

(30) Foreign Application Priority Data

Sep. 9, 2016 (DE) .......................... 10 2015 115 128

(51) Int. Cl.
*F21S 43/20* (2018.01)
*B60Q 1/26* (2006.01)
*G03H 1/30* (2006.01)
*B60Q 1/00* (2006.01)
*G03H 1/02* (2006.01)
(Continued)

(52) U.S. Cl.
CPC ............ *F21S 43/26* (2018.01); *B60Q 1/0041* (2013.01); *B60Q 1/2607* (2013.01); *F21S 43/13* (2018.01); *F21S 43/14* (2018.01); *G03H 1/0005* (2013.01); *G03H 1/0236* (2013.01);
(Continued)

(58) Field of Classification Search
CPC .. F21S 43/10; F21S 43/13; F21S 43/14; F21S 43/16; F21S 43/20; F21S 43/26; B60Q 1/0041; B60Q 1/2607; G03H 1/0005; G03H 1/0236; G03H 1/0248; G03H 1/2286; G03H 1/30; G03H 2222/34
See application file for complete search history.

(56) References Cited

U.S. PATENT DOCUMENTS 4,916,593 A * 4/1990 Moss ..................... B60Q 1/302
362/503
5,455,747 A 10/1995 Aoyama
(Continued)

FOREIGN PATENT DOCUMENTS

DE 44 21 306 C2 12/1999
DE 10 2006 043 402 A1 3/2008
(Continued)

*Primary Examiner* — Alan B Cariaso
(74) *Attorney, Agent, or Firm* — Muncy, Geissler, Olds & Lowe, P.C.

(57) ABSTRACT

A lighting device for vehicles, including a housing, which is closed by a transparent cover panel and contains a holographic lamp unit having has a light source unit, and including an optical unit containing a holographic element for generating a holographic luminous surface, the holographic element being disposed between the light source unit and the cover panel, so that it may be back-lit with the aid of the light source unit, and the holographic unit has a structure such that the holographic luminous surface is disposed between the holographic element and the cover panel, forming a distance from the holographic element and the cover panel.

13 Claims, 4 Drawing Sheets

(51) Int. Cl.
*G03H 1/00* (2006.01)
*G03H 1/22* (2006.01)
*F21S 43/13* (2018.01)
*F21S 43/14* (2018.01)

(52) U.S. Cl.
CPC ......... *G03H 1/0248* (2013.01); *G03H 1/2286* (2013.01); *G03H 1/30* (2013.01); *G03H 2222/34* (2013.01)

(56) References Cited

U.S. PATENT DOCUMENTS

| | | |
|---|---|---|
| 7,645,054 B2 | 1/2010 | Goihl |
| 2017/0327033 A1 | 11/2017 | Muegge et al. |

FOREIGN PATENT DOCUMENTS

| | | |
|---|---|---|
| DE | 10 2013 108 333 | 2/2015 |
| DE | 10 2014 119 326 A1 | 6/2016 |
| EP | 0 879 990 A2 | 11/1998 |
| EP | 0 993 989 A1 | 4/2000 |
| EP | 2 354 637 A2 | 8/2011 |
| EP | 2 492 579 A2 | 8/2012 |
| JP | H 07-192510 A | 7/1995 |
| JP | H 09-39653 A | 2/1997 |
| JP | H 09-185907 A | 7/1997 |
| WO | WO 2015/003949 A1 | 1/2015 |

\* cited by examiner

LIGHTING DEVICE FOR VEHICLES

This nonprovisional application is a continuation of International Application No. PCT/EP2016/071325, which was filed on Sep. 9, 2016, and which claims priority to German Patent Application No. DE 10 2015 115 128.6, which was filed in Germany on Sep. 9, 2015, and which are both herein incorporated by reference.

BACKGROUND OF THE INVENTION

Field of the Invention

The present invention relates to a lighting device for vehicles, including a housing, which is closed by a transparent cover panel and contains a holographic lamp unit having a light source unit, and including an optical unit containing a holographic element for creating a holographic luminous surface.

Description of the Background Art

A lighting device for vehicles is known from EP 2 354 637 A1, which includes a planar light conductor. Light is coupled in on a narrow side of the planar light conductor. Decoupling elements are disposed on a rear flat side of the planar light conductor in the main radiation direction, so that coupled-in light striking them is reflected in the direction of a front flat side, where it is decoupled. A luminous surface for generating a predefined light distribution is produced hereby.

A disadvantage of conventional lighting device is that the decoupling elements are manufactured by printing or are designed as an eroded or etched structure, so that they are clearly visible to a viewer, particularly even in the non-illuminated state thereof. This is felt to be bothersome. Perceptible optical structures of this type in a luminous surface are avoidable if the lighting device includes a holographic lamp unit having a light source unit, on the one hand, and an optical unit having a holographic element, on the other hand. The holographic element has a structure such that a light beam emitted by the light source unit is diffracted according to a predefined light distribution.

A lighting device for vehicles is known from DE 44 21 306 C2, which corresponds to U.S. Pat. No. 5,455,747, in which the holographic element is mounted on a cover panel of the lighting device. A virtual holographic luminous surface for generating, for example, a direction indicator function runs in the plane of the holographic element. The disadvantage of the known lighting device is that the holographic luminous surface produces only a planar appearance.

Planar lighting elements designed as OLED elements are also known. OLED elements are planar LED light sources for generating a homogeneously illuminated light surface of an arbitrary shape. The OLED technology is highly complex and therefore cost-intensive. In designing a light function using OLED elements, the latter must be structurally accommodated and held in such a way that a holding geometry must always be provided on at least one side of the OLED element, which is visible to a viewer. The appearance of a light function using one or multiple OLED elements may be advantageously improved and replaced by using a virtual holographic luminous surface, since the latter does not require a structural connection but may appear as a floating luminous surface generated in space.

SUMMARY OF THE INVENTION

It is therefore an object of the present invention to provide a lighting device for vehicles, including a holographic lamp unit, in such a way that an increased variability in the appearance of the holographic lamp unit is created, and thus a spatial appearance of the holographic lamp unit being improved.

To achieve this object, in an exemplary embodiment of the invention a holographic element is disposed between the light source unit and the cover panel, so that it may be back-lit with the aid of the light source unit, and in that the holographic unit has a structure such that the holographic luminous surface is disposed between the holographic element and the cover panel, forming a distance from the holographic element and the cover panel.

According to an embodiment of the invention, the holographic light unit includes a holographic element of this type, such that a virtual holographic luminous surface is formed in an area between the holographic unit and a cover panel of the lighting device. This results in a floating, virtual luminous surface, which creates a three-dimensionality due to the distance of a light function produced thereby from the cover panel.

According to an embodiment of the invention, the holographic luminous surface can be designed as a virtual luminous surface emitting a diffused light, in which the light is scattered in a diffused manner. The viewer perceives it as a uniformly, homogeneously illuminated surface. Alternatively, the holographic luminous surface may have a structuring which is visible to the viewer. Due to the distance of the holographic luminous surface from the cover panel, the light-emitting surface of the cover panel may also be enlarged.

According to an embodiment of the invention, the holographic luminous surface can run level with and/or in parallel or substantially parallel to the holographic element. The holographic lamp unit advantageously has a simple structure hereby.

According to an embodiment of the invention, the holographic element can be designed as a volume holographic element. The volume holographic element may be designed as a transmission-type volume holographic element or as a reflection-type volume holographic element. Light-deflecting structures of the volume holographic element are nearly invisible to the viewer. The light distribution information written in the holographic element includes information about geometric transformations and phase transformations. If the volume holographic element is illuminated by a light source, the input light is diffracted onto the grating structures of the volume holographic element according to the light distribution information stored therein, so that a light field having a certain spectral, geometric intensity distribution function is produced, a desired light emission, light direction and/or light distribution being achieved. The holographic element, which is designed as a diffractive optical element, may advantageously improve the efficiency of the optical unit, because a more precise light deflection or light distribution is achieved with the aid of the diffraction structures. The light deflection information of the holographic element is always correlated to the illumination from a predefined direction, the so-called reference or reconstruction direction. This preselected reference direction is defined when calculating the optics or writing to the holographic element. When the finished holographic element is illuminated from the reference direction, the light deflection or the stored functionality is activated, and the holographic element diffracts the incident light in the desired manner with the aid of the written diffraction structure. The volume holographic element may be designed as a film and has a nearly transparent appearance.

According to an embodiment of the invention, the holographic element can be designed as a surface hologram, for example, introduced as a surface structure into an injection-molding die and formed as a transmission hologram directly onto a transparent lens cover or as a reflection hologram onto a non-transparent, reflective component.

According to an embodiment of the invention, multiple light sources which are situated in different orientations with respect to the holographic element can be assigned to the same holographic element. The holographic element thus has different diffraction information, so that different holographic luminous surfaces may by generated as a function of the activation of the light sources. The holographic luminous surfaces may be overlaid as partial holographic luminous surface to form a predefined light distribution. The partial holographic luminous surfaces may be disposed on a shared plane or on different planes having a depth offset with respect to each other. Alternatively, the holographic luminous surfaces may also be provided as full holographic luminous surfaces, which each generate separate, predefined light distributions. Multiple light distributions may be advantageously generated hereby in a space-saving manner.

According to an embodiment of the invention, a separate lamp unit can be disposed behind the holographic element in the main radiation direction of the lighting unit to generate another light distribution. Since the holographic element has a transparent design, a light distribution may thus be used in a space-saving manner with the aid of a conventional lamp unit (without a holographic element).

According to an embodiment of the invention, multiple holographic lamp units can be provided, which are disposed next to each other in a horizontal and/or vertical direction and/or in an overlapping manner. In this way, a three-dimensional effect of the light function may be advantageously produced.

According to an embodiment of the invention, the holographic element can be provided with a structured design in such a way that the holographic luminous surface runs in the manner of a polygon. The holographic luminous surface thus has an additional three-dimensionality, which results in an improved depth effect of the holographic lamp unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting device according to the invention is used to generate signal functions, for example a turn-signal, tail light, brake light, navigation light or daytime running light function. It may be used in the rear or front area of the vehicle or as another lamp.

Figure 1:
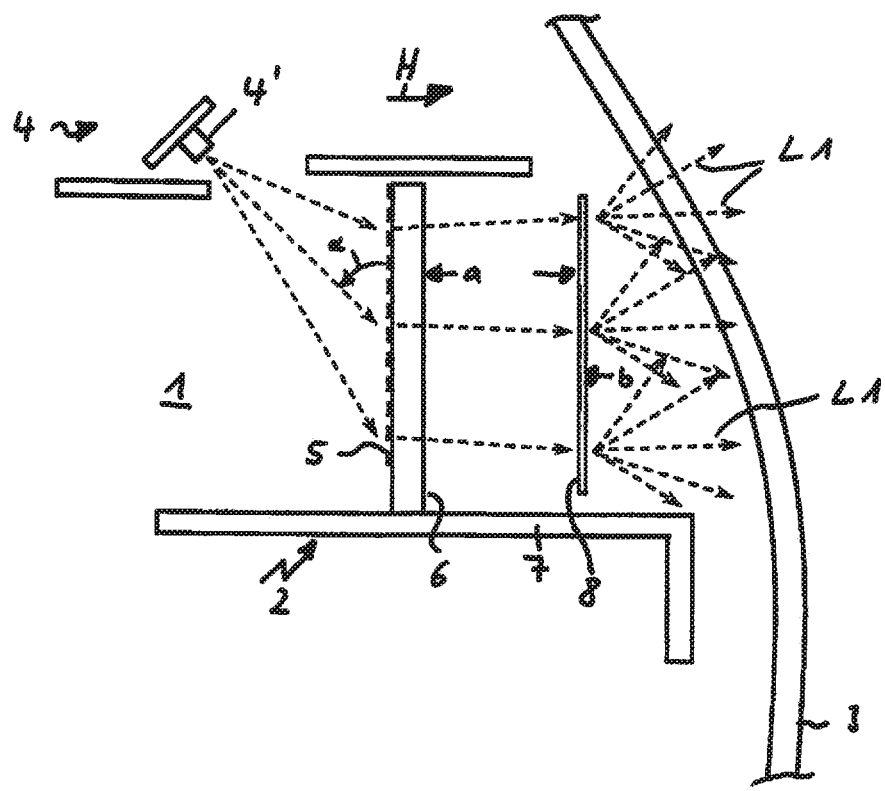
FIG. 1 shows a vertical sectional view of a holographic lamp unit according to an embodiment of the invention.

According to an embodiment of the lighting device according to FIG. 1, a holographic lamp unit 2 is disposed within a housing 1. Housing 1 is closed by a transparent cover panel 3.

Holographic lamp unit 2 includes a light source unit 4, which has a light source 4', and a holographic element 5, which is disposed on a carrier 6.

Light source 4' may be designed as an LED light source or as a laser light source (laser diode) or as a separate semiconductor-based light source. Light source 4' is obliquely offset at an acute angle $\alpha$ with respect to vertically running holographic element 5. Holographic element 5 is designed as a holographic, optical element, which belongs to the class of diffractive optical elements. Compared to conventional, refractive optical elements, diffractive optical elements are characterized by much smaller optical structures, which diffract the light within a limited spectral and/or angle range. The diffractive optical elements may be designed as grating, lens or mirror beam splitters and/or as a combination thereof.

Holographic element 5 is designed as a volume holographic element, for example in the form of an emulsion or a film. Holographic element 5 is connected to planar carrier 6 by gluing or by welding and/or ultrasonic welding. Alternatively, holographic element 5 may also be preformed by means of deep-drawing, so that it is overmolded in an injection-molding die as an inserted part, using a transparent material which forms planar and transparent carrier 6. Carrier 6 is designed to be transparent, for example as a lens cover. In the present exemplary embodiment, holographic element 5 is disposed behind planar carrier 6 in main radiation direction H of the lighting device. Planar carrier 6 is fastened, for example, to a holder 7 of housing 1. Volume holographic element 5 may be designed as a transmission-type volume holographic element or as a reflection-type volume holographic element.

Holographic element 5 is disposed in an area between light source 4' and cover panel 3. Holographic element 5 is thus situated such that it may be back-lit by light source 4'.

Alternatively, holographic element 5 may be designed as a surface holographic element.

Holographic element 5 has a structure such that a holographic luminous surface 8 is disposed between holographic element 5 and cover panel 3 at a distance a from holographic element 5 and at a distance b from cover panel 3. Holographic luminous surface 8 thus forms a more or less floating, virtual luminous surface. Holographic luminous surface 8 induces a diffused emission of a light beam L1 generated by light source 4'. The viewer thus perceives holographic luminous surface 8 as a uniformly, homogeneously illuminated surface.

In the present exemplary embodiment, holographic luminous surface 8 is disposed level with and in parallel to holographic element 5 and essentially with respect to cover panel 3. Alternatively, holographic luminous surface 8 may also be disposed at an angle to holographic element 5 or cover panel 3.

Alternatively, holographic element 5 may have a structure such that holographic luminous surface 8 is designed as a structured luminous surface having a visible structure pattern.

Figure 2:
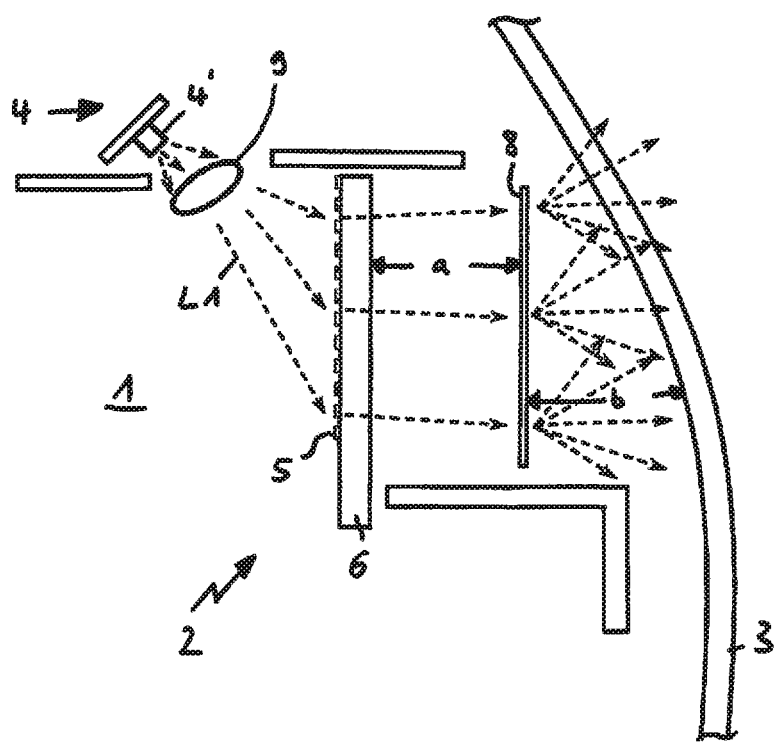
FIG. 2 shows a vertical sectional view of the holographic lamp unit according to an embodiment of the invention.

According to an embodiment of the lighting device according to FIG. 2, an optical element 9, namely a lens, is situated between light source 4' and holographic element 5. Light or light beam L1 emitted by light source 4' may be focused onto holographic element 5. Identical components or component functions of the different exemplary embodiments are provided with the same reference numerals.

Figure 3:
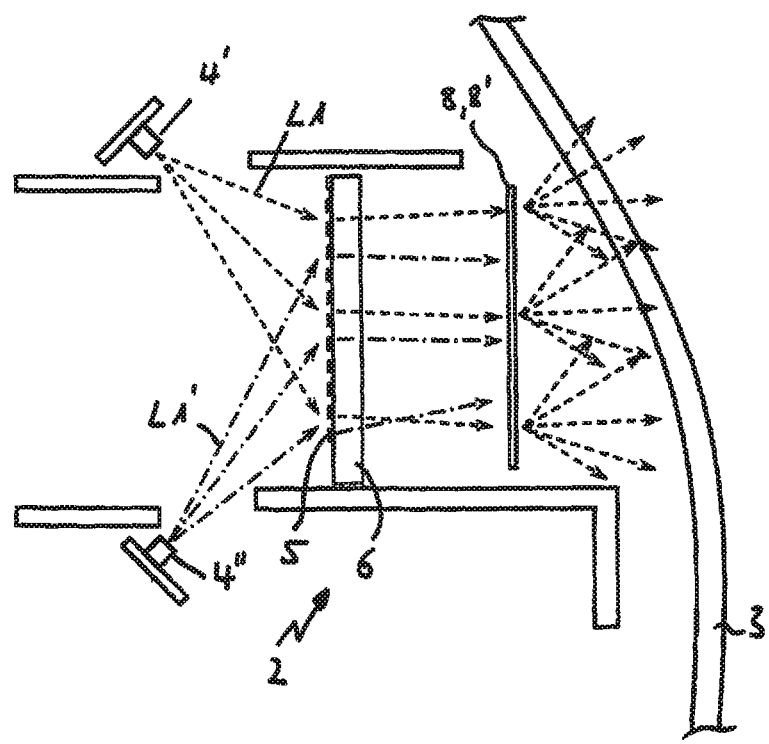
FIG. 3 shows a vertical sectional view of the holographic lamp unit according to an embodiment of the invention.

According to an embodiment of holographic lamp unit 2 according to FIG. 3, multiple light sources 4', 4", two in this case, may be assigned to the same holographic element 5. Light sources 4' and 4" are disposed or oriented in different directions with respect to holographic element 5. Holographic element 5 has light information assigned to each of light sources 4', 4", so that different holographic luminous surfaces 8, 8' are generated by alternately activating light sources 4', 4".

Light beam L1 emitted by first light source 4' strikes holographic element 5 so that holographic luminous surface 8 is used as the first partial holographic luminous surface. Light beam L1' emitted by second light source 4" causes a second partial holographic luminous surface 8' to be produced in holographic element 5, which generate the predefined light distribution, namely a brake light distribution, together with first partial holographic luminous surface 8. If only first light source 4' is activated, the luminance is less, so that a relatively weaker tail light distribution is generated. It is assumed that both light sources 4', 4" emit a red light color.

According to an embodiment of the invention, holographic element 5 may also be structured in such a way that holographic luminous surfaces 8, 8' are each used as full holographic luminous surfaces to generate separate light distributions. For example, if only first light source 4' is activated, first holographic luminous surface 8 may be used to generate the tail light function. If only second light source 4" is activated, second holographic luminous surface 8' may be used to generate a turn-signal function. This presupposes that second light source 4" emits light L' of a yellow light color.

Light sources 4', 4" may thus be activatable independently of each other for alternately generating the at least two different holographic luminous surfaces 8, 8', which are located in a shared plane or have a depth offset with respect to each other. The depth offset preferably runs in the main radiation direction, holographic luminous surfaces 8, 8' being offset in parallel to each other or run non-parallel to each other at an acute angle.

The invention thus facilitates the space-saving generation of different light distributions using a single holographic element 5.

Figure 4:
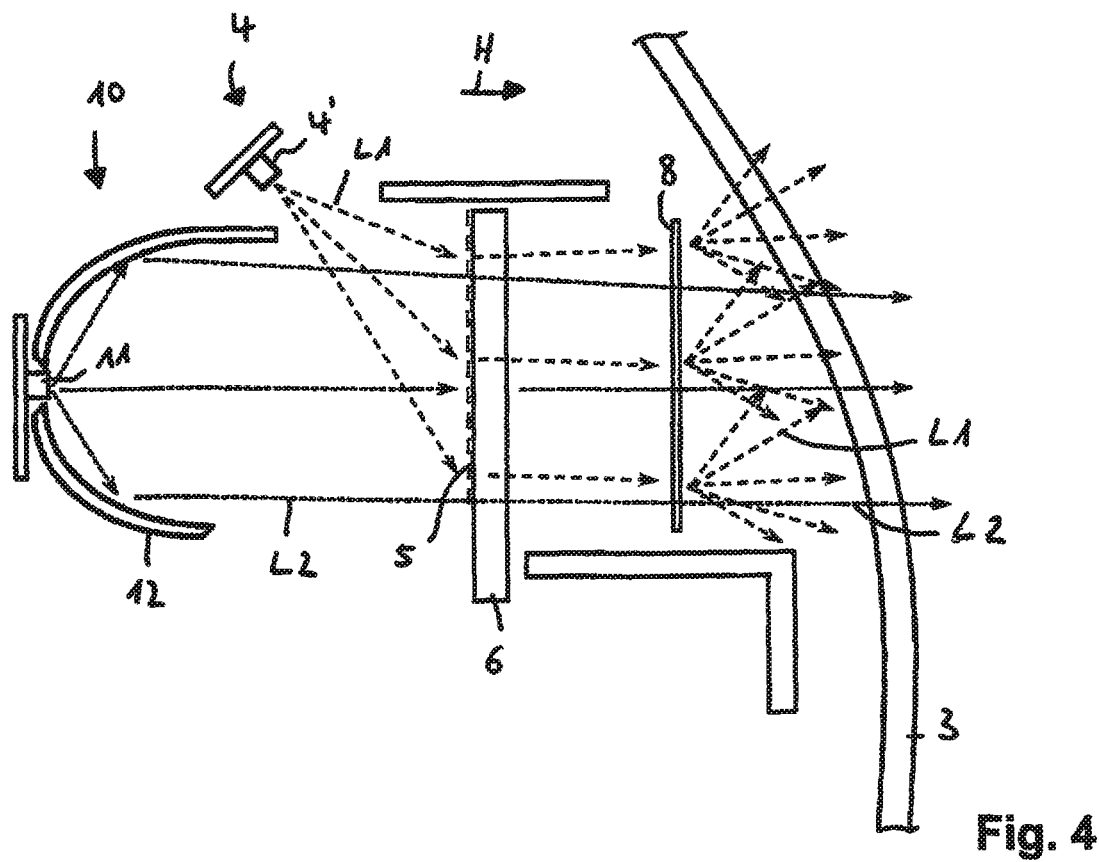
FIG. 4 shows a vertical sectional view of a lighting device, including a holographic lamp unit and a conventional lamp unit.

According to an embodiment of the invention according to FIG. 4, a lighting device is provided, which differs from the lighting device according to FIG. 1, in that a separate lamp unit 10 is situated behind holographic element 5 in main radiation direction H for generating another light distribution. Lamp unit 10 comprises a light source 11, which may be designed, for example, as an LED light source, and a reflector 12. Different light distributions may be generated by alternately activating light sources 4' and 11'. Since holographic element 5 and carrier 6 are provided with a transparent design, a light distribution which is induced only by lamp unit 10 may be generated with the aid of an emitted light L2 by not activating light source 4' and activating light source 11.

Figure 5:
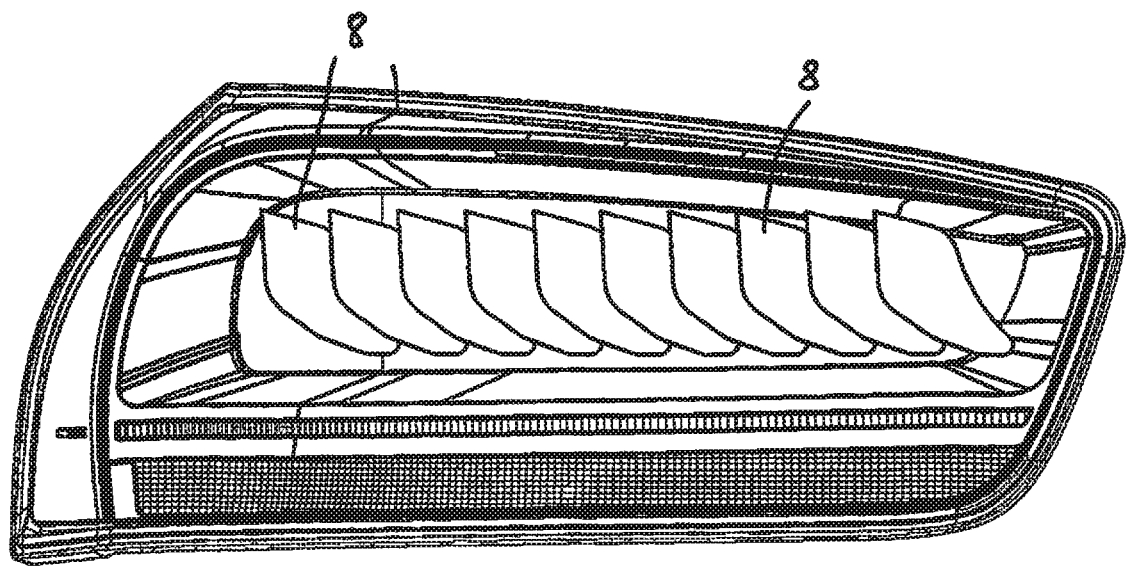
FIG. 5 shows a front view of a lighting device, including a plurality of holographic lamp units disposed next to each other in the horizontal direction, holographic luminous surfaces thereof being disposed in an overlapping manner.

According to an embodiment of the invention according to FIG. 5, multiple holographic lamp units 2 illustrated in the exemplary embodiments according to FIGS. 1 through 4 are disposed next to each other in the horizontal direction. Holographic lamp units 2 each generate holographic luminous surfaces 8, of which adjacent holographic luminous surfaces 8 are situated in an overlapping manner. A three-dimensional appearance of the light function thus induced is created hereby. It is assumed that all light sources 4' of holographic lamp units 2 are activated at the same time, or holographic elements 5 have the same design, so that only one single light function is generated.

According to an embodiment of the invention different holographic lamp units 2 may also be disposed next to each other, so that multiple light functions may be generated.

According to an of the invention, holographic lamp units 2 may also be disposed next to each other in the vertical direction or, in addition, possibly with adjacent holographic luminous surfaces 8 overlapping each other.

Figure 6:
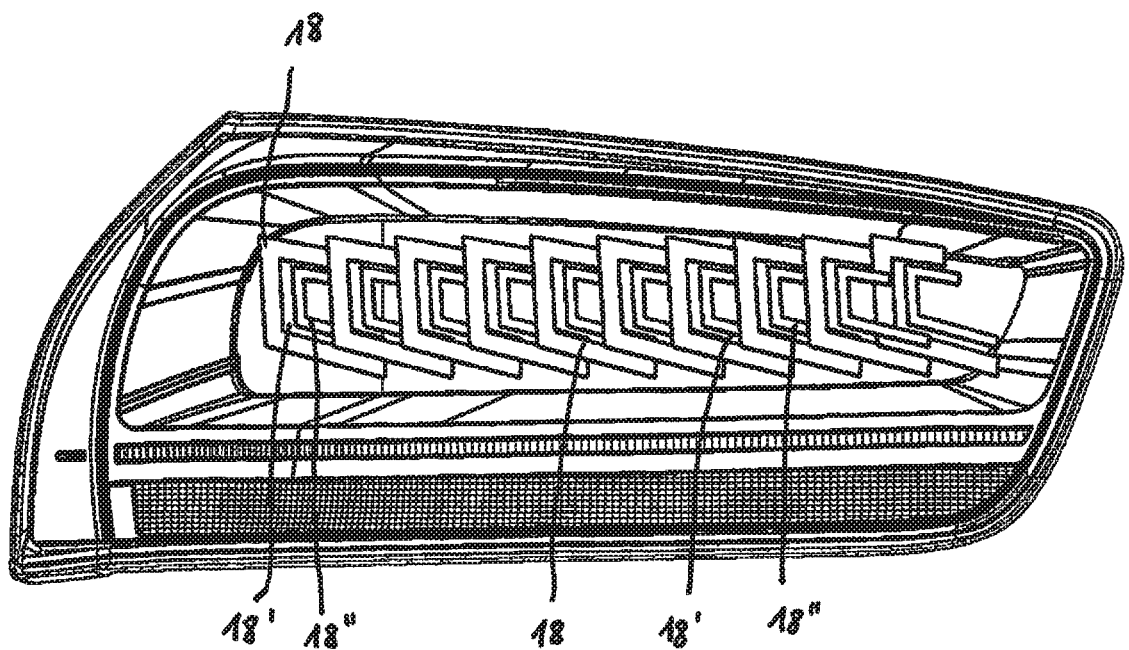
FIG. 6 shows a front view of the lighting device, including holographic lamp units disposed next to each other in the horizontal direction, multiple holographic lamp units each having holographic luminous surfaces which are offset with respect to each other in the main radiation direction.

According to an embodiment of the invention according to FIG. 6, holographic lamp units 2 may be disposed next to each other in the horizontal direction—as in the specific embodiment according to FIG. 5. A difference exists in that holographic elements 5 of holographic lamp units 2 are structured in such a way that partial holographic luminous surfaces 18, 18', 18" are disposed one after the other in main radiation direction H or in a stepped, offset manner. Partial holographic luminous surfaces 18, 18', 18" thus run in different planes, which are disposed offset to each other in main radiation direction H. This gives the light function an appearance having a greater impression of depth.

Figure 7:
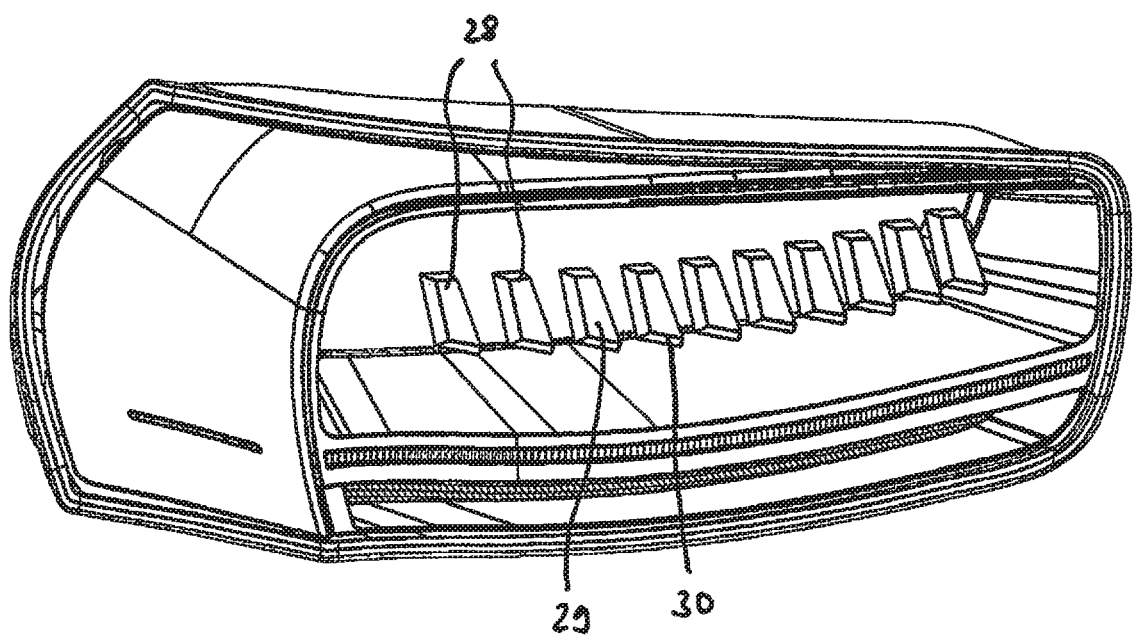
FIG. 7 shows a front view of the lighting device, including a plurality of holographic lamp units, which each produce polygonal holographic luminous surfaces.

According to an embodiment of the invention according to FIG. 7, multiple holographic lamp units 2 are disposed next to each other in the horizontal direction, holographic elements 5 being structured in such a way that holographic lamp units 2 each generate polygonal luminous surfaces 28. Holographic luminous surface 28 has a more or less three-dimensional structure, a front surface 29 as well as sloped edge surfaces 30 and a rear surface are formed. Holographic luminous surface 28 thus has a three-dimensional design for forming a three-dimensional luminous surface.

It is understood that the aforementioned features may each be used alone or in arbitrary multiple combinations. The exemplary embodiments described are not to be understood as a conclusive enumeration but instead serve as examples for describing the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for vehicles, the lighting device comprising:
   a housing that has a transparent cover panel;

a holographic lamp unit including a light source unit and a holographic element for creating a holographic luminous surface, wherein the holographic element is arranged between the light source unit and the cover panel so that the holographic element is adapted to be back-lit via the light source unit, and wherein the holographic element has a structure such that the holographic luminous surface is arranged between the holographic element and the cover panel, the holographic luminous surface being spaced apart from the holographic element by a first distance and being spaced apart from the cover panel by a second distance, and wherein the holographic luminous surface is a floating, virtual luminous surface that runs substantially parallel to the holographic element.

2. The lighting device according to claim 1, wherein the holographic luminous surface emits a diffused light and is designed as a homogeneous luminous surface or as a structured luminous surface having a visible structure pattern.

3. The lighting device according to claim 1, wherein the holographic element is a volume holographic element or a surface holographic element, with the aid of which a light beam is diffracted at a defined angle and/or within a defined spectral range thereof.

4. The lighting device according to claim 1, wherein the light source unit includes at least two light sources disposed in different directions in relation to the holographic element and are activatable independently of each other for alternately generating at least two different holographic luminous surfaces that are located in a shared plane or have a depth offset with respect to each other.

5. The lighting device according to claim 4, wherein the at least two different holographic luminous surfaces are partial holographic luminous surfaces, which generate a predefined light distribution due to the overlapping thereof.

6. The lighting device according to claim 4, wherein the at least two different holographic luminous surfaces are full holographic luminous surfaces, which are each used to generate a separate light distribution.

7. The lighting device according to claim 1, wherein a separate lamp unit is arranged in a main radiation direction of the holographic element for generating another light distribution, and wherein the light source unit of the holographic lamp unit is arranged on a side of the separate lamp unit so that light emitted by the light source unit of the holographic lamp unit and light emitted by the separate lamp unit directly strike the holographic element.

8. The lighting device according to claim 7, wherein a light source of the separate lamp unit is provided within a reflector and wherein the light source unit is positioned outside of the reflector.

9. The lighting device according to claim 1, wherein at least two holographic lamp units are provided, so that at least two holographic luminous surfaces are arranged next to each other in a horizontal and/or vertical direction and/or in an overlapping manner.

10. The lighting device according to claim 1, wherein the holographic element of the holographic lamp unit is structured such that the holographic luminous surface runs in a polygonal manner for forming a three-dimensional luminous surface.

11. The lighting device according to claim 1, wherein the holographic element extends on a single plane.

12. The lighting device according to claim 1, further comprising a lens that is positioned between the light source unit and the holographic element.

13. The lighting device according to claim 1, wherein the holographic luminous surface is spaced apart from an entirety of the holographic element.

* * * * *